US011282002B2

(12) United States Patent
Huang

(10) Patent No.: US 11,282,002 B2
(45) Date of Patent: Mar. 22, 2022

(54) METHOD AND APPARATUS FOR SECURE CHECK-IN

(71) Applicant: ADVANCED NEW TECHNOLOGIES CO., LTD., Grand Cayman (KY)

(72) Inventor: Qi Huang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/883,730

(22) Filed: May 26, 2020

(65) Prior Publication Data

US 2020/0286006 A1    Sep. 10, 2020

Related U.S. Application Data

(63) Continuation of application No. PCT/CN2020/071123, filed on Jan. 9, 2020.

(30) Foreign Application Priority Data

Jun. 28, 2019  (CN) .......................... 201910573793.9

(51) Int. Cl.
*G06Q 10/02* (2012.01)
*G06K 9/00* (2006.01)
(Continued)

(52) U.S. Cl.
CPC ......... *G06Q 10/02* (2013.01); *G06K 9/00288* (2013.01); *G06Q 30/0645* (2013.01); *G07C 9/00563* (2013.01); *G07C 9/00904* (2013.01)

(58) Field of Classification Search
CPC ...................................................... G06Q 10/02
(Continued)

(56) References Cited

U.S. PATENT DOCUMENTS 10,521,988 B1\*  12/2019  Allibhoy ............ G07C 9/00904
2003/0149576 A1\*   8/2003  Sunyich ................ G06Q 10/02
                                                                            705/5
(Continued)

FOREIGN PATENT DOCUMENTS

CN          105354619 A       2/2016
CN          105551118 A       5/2016
(Continued)

OTHER PUBLICATIONS

"Provisioning Authentication to Mobile Devices." Jun. 16, 2006. The IP.com Journal, p. 1. https://ip.com/IPCOM/000137367., (Year: 2006).\*
(Continued)

*Primary Examiner* — Jeff Zimmerman
*Assistant Examiner* — Hunter A Molnar

(57) ABSTRACT

A method includes obtaining identity information of a reservation person making a reservation for renting a target room and face image information of a check-in person who will check in to the target room; uploading the identity information of the reservation person and the face image information of the check-in person to an electronic identity authentication server storing electronic identity information; in response that the reservation person is the same as the check-in person, generating token information for opening the target room.

20 Claims, 6 Drawing Sheets

(51) Int. Cl.
*G06Q 30/06* (2012.01)
*G07C 9/00* (2020.01)

(58) Field of Classification Search
USPC .......................................................... 705/5
See application file for complete search history.

(56) References Cited

U.S. PATENT DOCUMENTS

| | | | |
|---|---|---|---|
| 2003/0208386 A1* | 11/2003 | Brondrup | H04W 12/0013 |
| | | | 705/5 |
| 2007/0079128 A1 | 4/2007 | Cheng et al. | |
| 2007/0176739 A1* | 8/2007 | Raheman | G07C 9/00904 |
| | | | 340/5.64 |
| 2007/0176769 A1 | 8/2007 | Boss | |
| 2010/0201536 A1* | 8/2010 | Robertson | G07C 9/00904 |
| | | | 340/686.6 |
| 2013/0024222 A1 | 1/2013 | Dunn | |
| 2013/0059603 A1 | 3/2013 | Guenec et al. | |
| 2013/0172068 A1* | 7/2013 | Zhou | G06Q 20/3223 |
| | | | 463/16 |
| 2013/0257589 A1 | 10/2013 | Mohiuddin et al. | |
| 2014/0156111 A1 | 6/2014 | Ehrman | |
| 2014/0207499 A1* | 7/2014 | Fliess | G06Q 10/02 |
| | | | 705/5 |
| 2015/0161832 A1 | 6/2015 | Esselink et al. | |
| 2015/0170448 A1 | 6/2015 | Robfogel et al. | |
| 2015/0363989 A1* | 12/2015 | Scalisi | H04N 7/186 |
| | | | 348/143 |
| 2016/0300413 A1* | 10/2016 | Robertson | H04W 12/08 |
| 2017/0213406 A1 | 7/2017 | Fares et al. | |
| 2018/0018594 A1* | 1/2018 | Choi | G06Q 10/02 |
| 2018/0061155 A1 | 3/2018 | Ghorpade et al. | |
| 2018/0130276 A1 | 5/2018 | Scoggins et al. | |
| 2019/0092280 A1 | 3/2019 | Oesterling et al. | |
| 2020/0117156 A1* | 4/2020 | Guan | G05B 19/048 |

FOREIGN PATENT DOCUMENTS

| | | | |
|---|---|---|---|
| CN | 106453605 A | | 2/2017 |
| CN | 107154094 A | | 9/2017 |
| CN | 107231235 A | | 10/2017 |
| CN | 107239984 A | | 10/2017 |
| CN | 107682339 A | | 2/2018 |
| CN | 107967741 A | | 4/2018 |
| CN | 107993310 A | | 5/2018 |
| CN | 108877006 A | | 11/2018 |
| CN | 109035521 A | | 12/2018 |
| CN | 109242634 A | | 1/2019 |
| CN | 110334824 A | | 10/2019 |
| JP | 2000-142282 A | | 5/2000 |
| JP | 3716647 B2 | | 11/2005 |
| WO | 2018/232550 A1 | | 12/2018 |
| WO | WO-2020106391 A | * | 5/2020 ......... H04L 63/0823 |

OTHER PUBLICATIONS

First Office Action for Chinese Application No. 201910573793.9, dated May 14, 2020, 26 pages.
Second Office Action for Chinese Application No. 201910573793.9, dated Jun. 19, 2020, 13 pages.
Search Report for Chinese Application No. 201910573793.9, dated May 9, 2020.
Written Opinion and International Search Report for PCT Application No. PCT/CN2020/071123 made available to public dated Dec. 30, 2020.
Supplementary Search for Chinese Application No. 201910573793.9 dated Jan. 12, 2021.
Search Report for Taiwanese Application No. 109103865 dated Mar. 15, 2021.

* cited by examiner

METHOD AND APPARATUS FOR SECURE CHECK-IN

CROSS-REFERENCE TO RELATED APPLICATIONS

This application is a continuation application of International Patent Application No. PCT/CN2020/071123, filed on Jan. 9, 2020, which claims priority to and benefits of the Chinese Patent Application No. 201910573793.9, filed on Jun. 28, 2019. The contents of the above-referenced applications are incorporated herein by reference in their entirety.

TECHNICAL FIELD

This specification relates to the field of security protection technologies, and in particular, to a secure check-in method and apparatus, a secure check-in device, and a storage medium.

BACKGROUND

With continuous development of technologies and cities, the house renting industry begins to take on a tendency of remotely managing housing resources by using door locks, which brings great convenience to a check-in person and a landlord.

However, in an existing process of remote housing resource management, there is a problem that whether a check-in person is a reservation person of a room cannot be checked, and consequently some hidden security threat exists in check-in of the room.

SUMMARY OF THE INVENTION

An objective of one or more embodiments of this specification is to provide a secure check-in method, apparatus, and device and a storage medium, to resolve a problem that whether a check-in person is a reservation person of a room cannot be checked in the existing technology.

According to an aspect, the one or more embodiments of this specification provide a method, including: obtaining identity information of a first reservation person making a reservation for renting a target room and face image information of a check-in person who will check in to the target room; uploading, from a renting platform, the identity information of the first reservation person and the face image information of the check-in person to an electronic identity authentication server that stores electronic identity information; receiving, from the electronic identity authentication server, a verification result whether the first reservation person and the check-in person are the same person generated by the electronic identity authentication server based on comparison of face image information of the first reservation person with the face image information of the check-in person; generating, in response that the verification result indicates that the first reservation person is the same as the check-in person, token information for opening the target room; receiving a door-opening request from a target door lock device of the target room based on the token information, wherein the door-opening request comprises identification information of the target door lock device and the token information; querying, according to the identification information of the target door lock device, for order information corresponding to the target door lock device; matching identity information of a second reservation person in the order information corresponding to the target door lock device with the identity information of the first reservation person; and delivering, if the identity information of the second reservation person is matched with the identity information of the first reservation person, a door-opening instruction to the target door lock device to open the target room.

In some embodiments, the delivering, if the identity information of the second reservation person is matched with the identity information of the first reservation person, a door-opening instruction to the target door lock device may comprise obtaining, if the identity information of the second reservation person is matched with the identity information of the first reservation person, a check-in time period of the target room, and determining, according to the check-in time period, whether a current time meets a check-in condition; and delivering, if the current time meets the check-in condition, the door-opening instruction to the target door lock device.

In some embodiments, the delivering the door-opening instruction to the target door lock device may comprise delivering the door-opening instruction to a mobile terminal of the check-in person for the mobile terminal to deliver to the target door lock device via wireless communication, such as Blue-tooth or new field wireless communication.

In some embodiments, the generating token information for opening the target room may comprise recording a generation time at which the token information is generated and a valid time period of the token information in the token information. The door-opening request may further comprise a receiving time at which the target door lock device receives the token information, and the method may further comprise determining whether the token information is valid according to the generation time, the valid time period, and the receiving time.

In some embodiments, the method may further comprise obtaining, in response to a renting request, the identity information of the first reservation person, check-in information, and information of the target room; and generating order information according to the identity information of the first reservation person, the check-in information, and the information of the target room. The identity information of the first reservation person may include identity card information, the check-in information may include a check-in time period and a number of check-in persons, and the information of the target room may include identification information of a target door lock device of the target room and location information of the target room.

According to another aspect, the one or more embodiments of this specification provide a method comprising: determining, in response to a check-in request based on target order information, whether a check-in person who will check in to a target room is in an area of the target room of the target order information; obtaining, in response to determining that the check-in person is in the area, identity information of a reservation person making a reservation for renting the target room and face image information of the check-in person from the target order information; sending, from a renting platform, the face image information of the check-in person and the identity information of the reservation person to an electronic identity authentication server that stores electronic identity information; determining target electronic identity information based on the identity information of the reservation person, wherein the identity information of the reservation person is matched with identity information in the target electronic identity information; comparing face image information on the target electronic identity information with the face image information of the check-in person; returning, if the face image information on the target electronic identity information is matched with the face image information of the check-in person, to the renting platform receipt information; verifying, based on the returned receipt information, whether the reservation person is the same as the check-in person; receiving token information in response to verifying that the reservation person is the same as the check-in person; transmitting to a target door lock device of the target room the token information, to initiate a door-opening request.

In some embodiments, the method further comprises: receiving a door-opening instruction, wherein the door-opening instruction is generated in response to the door-opening request, and the door-opening request comprises identification information of the target door lock device and the token information; and transmitting to the target door lock device the door-opening instruction from a user terminal loaded with the renting platform to open the target room via a wireless communication channel.

In some embodiments, the determining whether a check-in person who will check in to a target room is in an area of the target room of the target order information comprises: determining whether a location of a user terminal of the check-in person loaded with an application of the renting platform is in the area of the target room in the target order information; or determining whether a user terminal of the check-in person loaded with an application of the renting platform is connected to the target door lock device of the target room via a wireless communication channel; or determining whether a user terminal of the check-in person loaded with an application of the renting platform is connected to the target door lock device of the target room via a near filed communication channel.

In some embodiments, the transmitting to a target door lock device of the target room the token information comprises: generating, according to the token information, a door-opening two-dimensional barcode, and transmitting or displaying to the target door lock device the door-opening two-dimensional barcode via a camera on the target door lock device, to transmit the token information; or transmitting to the target door lock device the token information from a user terminal loaded with an application of the renting platform via a wireless communication channel; or transmitting to the target door lock device the token information from a user terminal loaded with an application of the renting platform via a new field communication channel.

According to another aspect, the one or more embodiments of this specification provide a device comprising: a processor, a memory storing computer executable instructions, executable by the processor to cause the processor to perform operations comprising: obtaining identity information of a first reservation person making a reservation for renting a target room and face image information of a check-in person who will check in to the target room; uploading, from a renting platform, the identity information of the first reservation person and the face image information of the check-in person to an electronic identity authentication server that stores electronic identity information; receiving, from the electronic identity authentication server, a verification result whether the first reservation person and the check-in person are the same person generated by the electronic identity authentication server based on comparison of face image information of the first reservation person with the face image information of the check-in person; generating, in response that the verification result indicates that the first reservation person is the same as the check-in person, token information for opening the target room; receiving a door-opening request from a target door lock device of the target room based on the token information, wherein the door-opening request comprises identification information of the target door lock device and the token information; querying, according to the identification information of the target door lock device, for order information corresponding to the target door lock device; matching identity information of a second reservation person in the order information corresponding to the target door lock device with the identity information of the first reservation person; and delivering, if the identity information of the second reservation person is matched with the identity information of the first reservation person, a door-opening instruction to the target door lock device to open the target room.

According to another aspect, the one or more embodiments of this specification provide a non-transitory computer-readable storage medium configured with instructions executable by one or more processors to cause the one or more processors to perform operations comprising: obtaining identity information of a first reservation person making a reservation for renting a target room and face image information of a check-in person who will check in to the target room; uploading, from a renting platform, the identity information of the first reservation person and the face image information of the check-in person to an electronic identity authentication server that stores electronic identity information; receiving, from the electronic identity authentication server, a verification result whether the first reservation person and the check-in person are the same person generated by the electronic identity authentication server based on comparison of face image information of the first reservation person with the face image information of the check-in person; generating, in response that the verification result indicates that the first reservation person is the same as the check-in person, token information for opening the target room; receiving a door-opening request from a target door lock device of the target room based on the token information, wherein the door-opening request comprises identification information of the target door lock device and the token information; querying, according to the identification information of the target door lock device, for order information corresponding to the target door lock device; matching identity information of a second reservation person in the order information corresponding to the target door lock device with the identity information of the first reservation person; and delivering, if the identity information of the second reservation person is matched with the identity information of the first reservation person, a door-opening instruction to the target door lock device to open the target room.

In technical solutions of the one or more embodiments of this specification, whether a reservation person and a check-in person are the same person is verified by using an electronic identity authentication system, identity information of the reservation person, and face image information of the check-in person. If yes, token information for opening a target room is generated, thereby implementing verification on consistency between the check-in person and the reservation person, achieving an in-person check-in effect, and ensuring check-in security. In addition, verification steps are simple and easy to perform, and verification efficiency is high.

In the technical solutions of the one or more embodiments of this specification, the identity information of the reservation person and the face image information of the check-in person are sent to a back-end server, token information sent by the back-end server when the reservation person and the check-in person are verified to be the same person by the back-end server according to the identity information of the reservation person and the face image information of the check-in person is received, and the token information is transmitted to a target door lock device, for the target door lock device to initiate a door-opening request to the back-end server based on the token information. That is, after the reservation person and the check-in person are verified to be the same person, the door-opening request is initiated, thereby achieving an in-person check-in effect and ensuring the check-in security.

BRIEF DESCRIPTION OF THE DRAWINGS

To describe the technical solutions in one or more embodiments of the specification or in the existing technologies more clearly, the following briefly introduces the accompanying drawings required for describing the embodiments or the existing technologies. Apparently, the accompanying drawings in the following description show merely some embodiments in one or more embodiments of the specification, and a person of ordinary skill in the art may still derive other drawings from these accompanying drawings without creative efforts.

DETAILED DESCRIPTION OF THE EMBODIMENTS

One or more embodiments of this specification provide a method, apparatus, and device and a storage medium for secure check-in, to resolve a problem that whether a check-in person is a reservation person of a room cannot be checked in the existing technology.

To make a person skilled in the art understand the technical solutions in the one or more embodiments of this specification better, the following clearly and completely describes the technical solutions in the one or more embodiments of this specification with reference to the accompanying drawings in the one or more embodiments of this specification. Apparently, the described embodiments are merely some but not all of the embodiments of this specification. All other embodiments obtained by a person of ordinary skill in the art based on the one or more embodiments of this specification without creative efforts may fall within the protection scope of the one or more embodiments of this specification.

Figure 1:
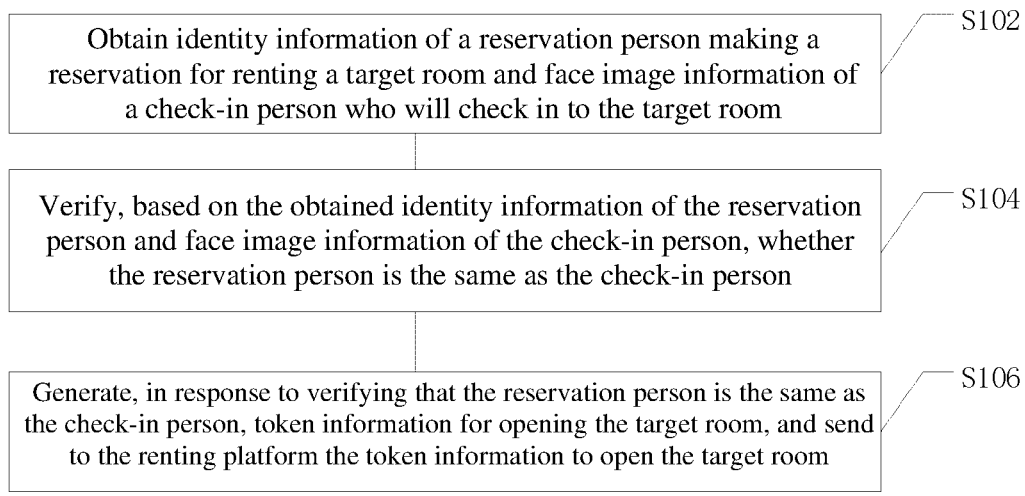
FIG. 1 is a flowchart of a secure check-in method, according to an embodiment of the specification.

An embodiment of the specification provides a secure check-in method, applied to a back-end server of a house renting platform. The back-end server of the house renting platform may be, for example, an independent server, or may be a server cluster including a plurality of servers. This is not specifically limited in this exemplary embodiment. FIG. 1 is a flowchart of a secure check-in method, according to an embodiment of the specification, including the following steps.

At step S102, the method may include obtaining identity information of a reservation person making a reservation for renting a target room and face image information of a check-in person who will check in to the target room.

In this embodiment of the specification, a process of renting a room on a house renting platform by a reservation person is first described. The specific process may include the following two steps.

At a first step, the process may include obtaining, in response to a housing resource renting request, identity information of the reservation person, check-in information, and information of the target room, from the house renting platform.

The house renting platform presents housing resource information to the reservation person. The reservation person browses housing resource information on the house renting platform, selects a target room (namely, an interested room) from the housing resource information, and initiates a housing resource renting request to the house renting platform based on the target room. In response to the housing resource renting request, the house renting platform obtains identity information of the reservation person, check-in person information, and sends the identity information of the reservation person, the check-in information, and information of the target room to a back-end server of the house renting platform. Specifically, the identity information of the reservation person may include an identity card number, a contact way, a name, an address, and the like of the reservation person; the check-in information may include a check-in time period, numbers of check-in persons, and the like; and the information of the target room includes identification information of a target door lock device of the target room, location information of the target room, and the like. This is not specifically limited in this embodiment. The house renting platform may provide an information filling page to the reservation person, for the reservation person to fill in the information filling page with the identity information of the reservation person and check-in information. The back-end server of the house renting platform receives the identity information of the reservation person, the check-in information, and the information about the target room from the house renting platform.

At a second step, the process may include generating target order information according to the identity information of the reservation person, the check-in information, and the information of the target room. That is, the back-end server of the house renting platform may bind the identity information of the reservation person, the check-in information, and the information about the target room, to obtain the target order information.

Figure 2:
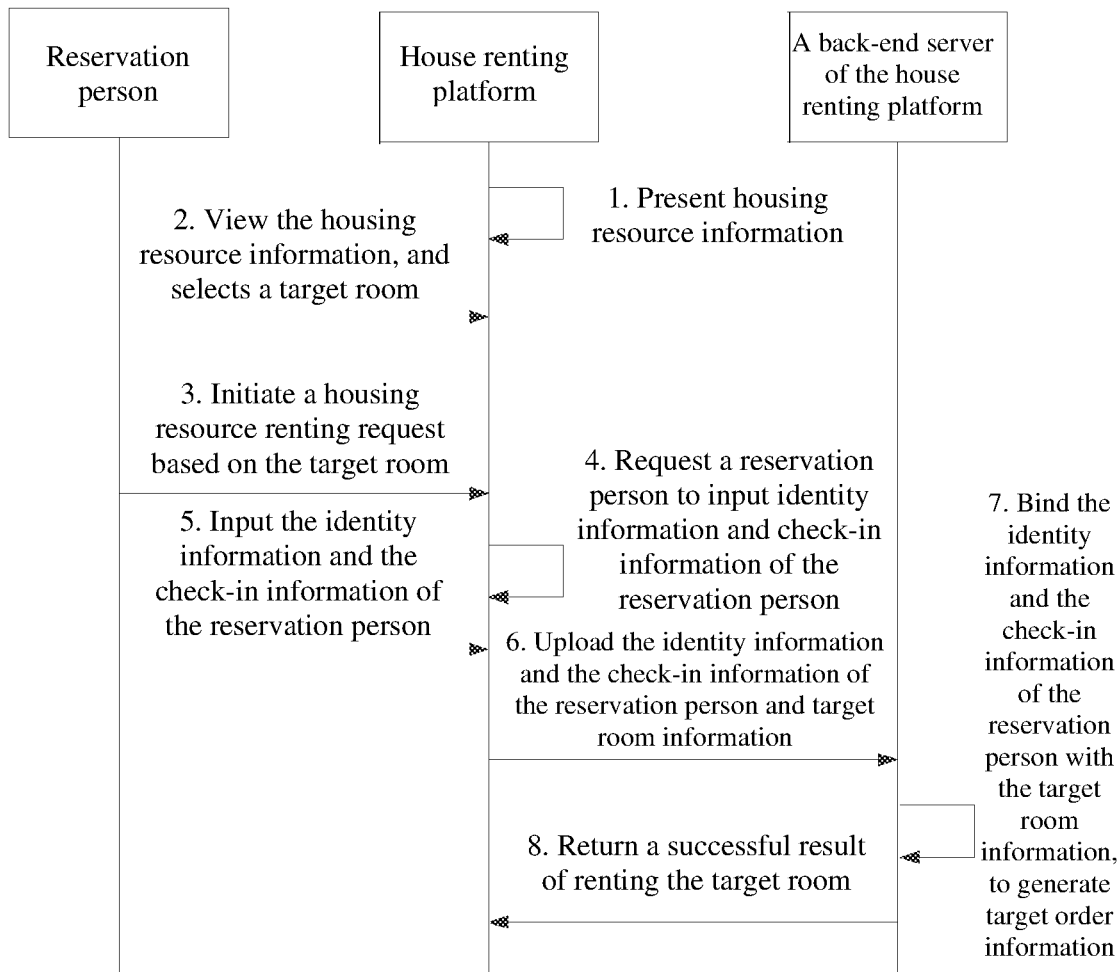
FIG. 2 is a schematic flowchart of renting a room, according to an embodiment of the specification.

FIG. 2 is a schematic flowchart of renting a room, according to an embodiment of the specification. As shown in FIG. 2, a process of renting a room may include: 1) A house renting platform presents housing resource information. 2) A reservation person views, by using a user terminal loaded with an application of the house renting platform, the housing resource information presented by the house renting platform, and selects a target room form the housing resource information. 3) The reservation person initiates a housing resource renting request to the house renting platform based on the target room. 4) The house renting platform requests the reservation person to input identity information of the reservation person and check-in information. 5) The reservation person inputs the identity information of the reservation person and the check-in information. 6) The house renting platform uploads the identity information of the reservation person, the check-in information, and information about the target room to a back-end server of the house renting platform. 7) The back-end server of the house renting platform binds the identity information of the reservation person, the check-in information, and the information about the target room, to generate target order information. 8) The back-end server of the house renting platform returns a result of successfully renting the target room to the house renting platform, for the reservation person to view the renting result by using the user terminal having the house renting platform application.

Subsequently, if a check-in person needs to check in to the target room, a check-in process may include: querying, by the check-in person, for the target order information by using the user terminal having the house renting platform application, and subsequently initiating a check-in request to the house renting platform based on the target order information. In response to the check-in request, the house renting platform obtains, from the target order information, the identity information of the reservation person and face image information of the check-in person. Specifically, the house renting platform may capture a face image of the check-in person by using a camera of the user terminal having the house renting platform application, and subsequently sends the identity information of the reservation person (namely, the identity information of the reservation person renting the target room) and face image information of the check-in person (namely, the face image information of the check-in person checking in to the target room) that are obtained to the back-end server of the house renting platform. The back-end server receives the face image information of the check-in person and the identity information of the reservation person.

At step S104, the method may include verifying, based on the return receipt information whether the reservation person is the same as the check-in person.

In this embodiment of the application, the back-end server of the house renting platform may upload the identity information of the reservation person and the face image information of the check-in person to an electronic identity authentication server or system. The electronic identity authentication system verifies whether the reservation person is the same as the check-in person according to the face image information of the check-in person and the identity information of the reservation person. The electronic identity authentication system stores electronic identity cards of users. The electronic identity cards may include electronic identity information of users. The electronic identity card is an online functional certificate (also referred to as network certificate) of a resident identity card, and is authenticated and issued by a trusted identity authentication platform of the government. The electronic identity card may be used as a verification certificate of a personal legal identity. Each electronic identity card includes at least identity information and face image information of a user. Based on this, a verification process may include: comparing, by the electronic identity authentication system, the identity information of the reservation person with identity information in electronic identity cards of users, determining an electronic identity card of a user with the same identity information as that of the reservation person as a target electronic identity card, comparing face image information on the target electronic identity card with the face image information of the check-in person, and if the comparison succeeds, returning receipt information of successful verification to the back-end server of the house renting platform; and determining, by the back-end server of the house renting platform, that the reservation person is the same as the check-in person according to the receipt information of successful verification.

At step S106, the method may include generating, in response to verifying that the reservation person is the same as the check-in person, token information for opening the target room, and send the token information to the house renting platform, for the check-in person to open the target room based on the token information.

In this embodiment of the specification, if the reservation person is the same as the check-in person, token information for opening the target room is generated. The token information may be further used for representing successful identity verification. The successful identity verification herein means that the reservation person is the same as the check-in person.

The token information is sent to the house renting platform. The house renting platform transmits the token information to a target door lock device of the target room. The target door lock device generates a door-opening request according to the received token information and identification information of the target door lock device, and sends the door-opening request to the back-end server of the house renting platform. A process in which the house renting platform transmits the token information to the target door lock device of the target room is described below. Therefore, details are not described herein again.

Figure 3:
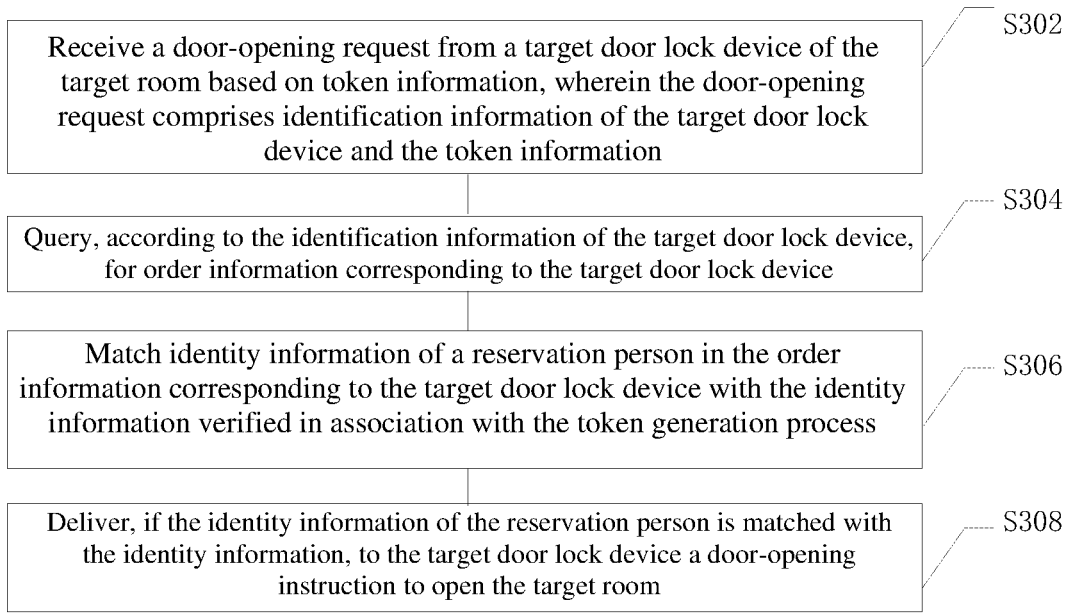
FIG. 3 is a flowchart of opening a target room according to a door-opening request, according to an embodiment of the specification.

A process of opening the target room according to the door-opening request is described below. FIG. 3 is a flowchart of opening a target room according to a door-opening request, according to an embodiment of the specification, including the following steps.

At step S302, the method may include receiving a door-opening request from a target door lock device of the target room based on the token information. The door-opening request includes identification information of the target door lock device and the token information.

At step S304, the method may include querying, according to the identification information of the target door lock device, for order information corresponding to the target door lock device.

In this embodiment of the specification, the identification information of the target door lock device is compared with identification information of a door lock device of each piece of order information, and order information to which a door lock device belongs is determined as the order information corresponding to the target door lock device, where comparison between identification information of the door lock device and the identification information of the target door lock device is successful.

At step S306, the method may include matching identity information of a reservation person in the order information corresponding to the target door lock device with identity information of a reservation person on which verification succeeds in the token information.

In this embodiment of the specification, the identity information of the reservation person on which verification succeeds in the token information is the identity information of the reservation person in Step S102. The identity information of reservation persons is obtained from all pieces of order information corresponding to the target door lock device, and the identity information of the reservation person on which verification succeeds in the token information is separately matched with the identity information of the reservation persons in all pieces of order information corresponding to the target door lock device.

At Step S308, the method may include delivering, if the identity information in the order information is matched with the identity information on which the verification succeeds in the token information, to the target door lock device a door-opening instruction to open the target room, for the target door lock device to open the target room in response to the door-opening instruction.

In this embodiment of the specification, if the identity information of the reservation person on which verification succeeds in the token information is successfully matched with identity information of a reservation person in a piece of order information corresponding to the target door lock device, a door-opening instruction is delivered to the target door lock device. The target door lock device receives the door-opening instruction and opens the target room in response to the door-opening instruction.

In some embodiments, delivering the door-opening instruction to the target door lock device by a back-end server of the house renting platform includes three manners: 1) directly deliver the door-opening instruction to the target door lock device; 2) deliver the door-opening instruction to the house renting platform, to deliver the door-opening instruction to the target door lock device by using Bluetooth of a user terminal having an application of the house renting platform. The back-end server of the house renting platform delivers the door-opening instruction to the house renting platform installed on a user terminal of a check-in person. The house renting platform delivers the door-opening instruction to the target door lock device by using Bluetooth of the user terminal; 3) deliver the door-opening instruction to the house renting platform, to deliver the door-opening instruction to the target door lock device by using NFC of a user terminal having an application the house renting platform. The back-end server of the house renting platform delivers the door-opening instruction to the house renting platform installed on a user terminal of a check-in person. The house renting platform delivers the door-opening instruction to the target door lock device by using NFC of the user terminal. The foregoing three manners are only examples, and are not intended to limit the specification.

To further improve check-in security, the generating token information for opening the target room and sending the token information to the house renting platform may include: generating the token information for opening the target room, recording a generation time and a valid time period of the token information, and sending the token information, the generation time, and the valid time period to the house renting platform. In this embodiment of the specification, a specific value of the valid time period may be voluntarily set. For example, the valid time period may be 45 seconds, or may be 1 minute. This is not specifically limited in this exemplary embodiment. To ensure the check-in security, the value of the valid time period may not be set to be overlong.

The back-end server of the house renting platform sends the token information, the generation time, and the valid time period to the house renting platform. The house renting platform sends the token information, the generation time, and the valid time period to the target door lock device. When receiving the token information, the target door lock records a receiving time of the token information, generates a door-opening request according to the token information, the generation time, the valid time period, the receiving time, and the identification information of the target door lock device, and uploads the door-opening request to the back-end server of the house renting platform. A process in which the house renting platform transmits the token information, the generation time, and the valid time period to the target door lock device of the target room is described below. Therefore, details are not described herein again.

Figure 4:
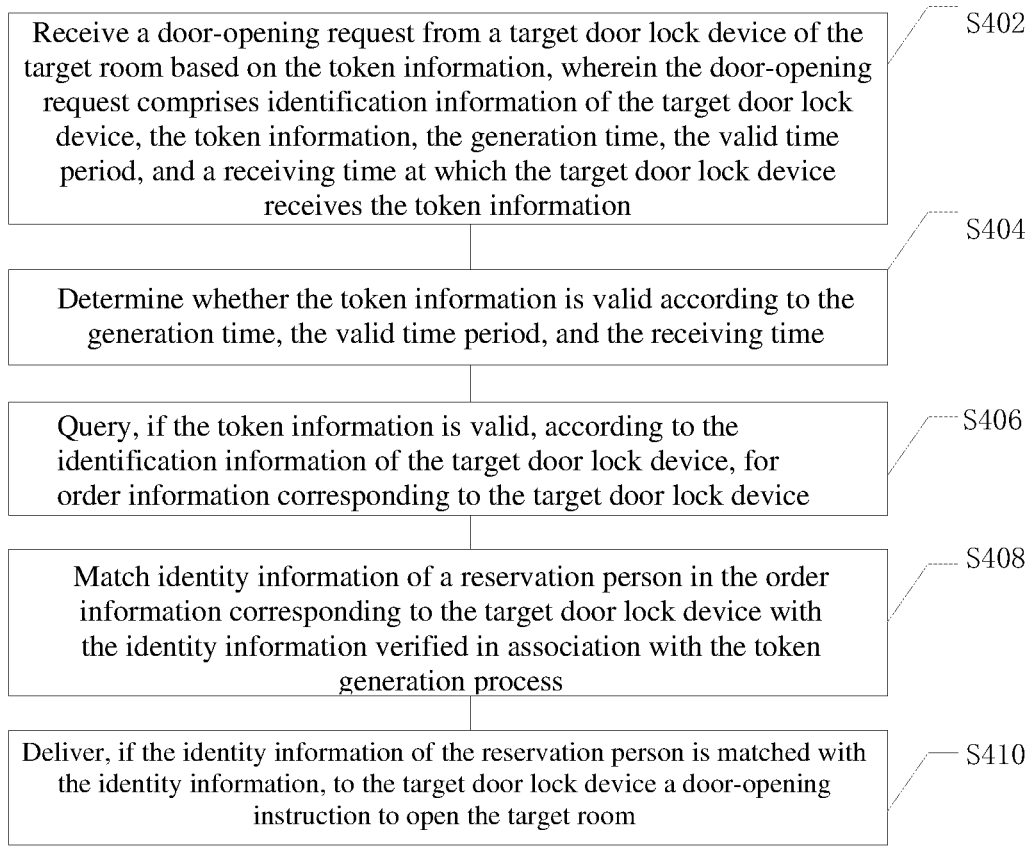
FIG. 4 is an another flowchart of opening a target room according to a door-opening request, according to an embodiment of the specification.

Based on this, a process of opening the target room according to the door-opening request is described below. FIG. 4 is a flowchart of opening a target room according to a door-opening request, according to an embodiment of the specification, including the following steps.

At Step S402, the method may include receiving the door-opening request based on token information by a target door lock device of the target room. The door-opening request includes identification information of the target door lock device, the token information, generation time, a valid time period, and a receiving time at which the target door lock device receives the token information.

At Step S404, the method may include determining whether the token information is valid according to the generation time, the valid time period, and the receiving time. In this embodiment of the specification, a time difference between the receiving time and the generation time is calculated, and whether the time difference falls within the valid time period is determined. If the time difference falls within the valid time period, the token information is determined to be valid; or if the time difference does not fall within the valid time period, the token information is determined to be invalid.

At Step S406, the method may include, querying, if the token information is valid, according to the identification information of the target door lock device, for order information corresponding to the target door lock device. In this embodiment of the specification, if the token information is valid, the order information corresponding to the target door lock device is queried for. A principle for querying for the order information corresponding to the target door lock device has been described above. Therefore, details are not described herein again.

At Step S408, the method may include matching identity information of a reservation person in the order information corresponding to the target door lock device with identity information of a reservation person on which verification succeeds in the token information. In this embodiment of the specification, the step has been described above. Therefore, details are not described herein again.

At Step S410, the method may include delivering, if the matching succeeds, a door-opening instruction to the target door lock device, for the target door lock device to open the target room in response to the door-opening instruction. In this embodiment of the specification, the step has been described above. Therefore, details are not described herein again.

It can be seen from the above that check-in security is improved by setting the valid time period of the token information, verifying validity of the token information, and performing subsequent verification when the token information is valid.

To ensure suitability of a check-in time, the delivering, if the matching succeeds, a door-opening instruction to the target door lock device may include: if the matching succeeds, obtaining a check-in time period for which the reservation person rents the target room, and determining, according to the check-in time period, whether a current time meets a check-in condition; and if the current time meets the check-in condition, delivering the door-opening instruction to the target door lock device. In this embodiment of the specification, a check-in time period for which the reservation person rents the target room is obtained from target order information, and whether a current time falls within the check-in time period is determined. If the current time falls within the check-in time period, it is determined that the current time meets a check-in condition; or if the current time does not fall within the check-in time period, it is determined that the current time does not meet the check-in condition. The determining whether the current time meets the check-in condition according to the check-in time period may ensure the suitability of the check-in time, thereby improving check-in security.

In some embodiments, whether a reservation person is the same as a check-in person is verified by using an electronic identity authentication system, identity information of the reservation person, and face image information of the check-in person. If the reservation person is the same as the check-in person, token information for opening a target room is generated, thereby implementing verification on consistency between the check-in person and the reservation person, achieving an in-person check-in effect, and ensuring check-in security. In addition, verification steps are simple and easy to perform, and verification efficiency is high.

Figure 5:
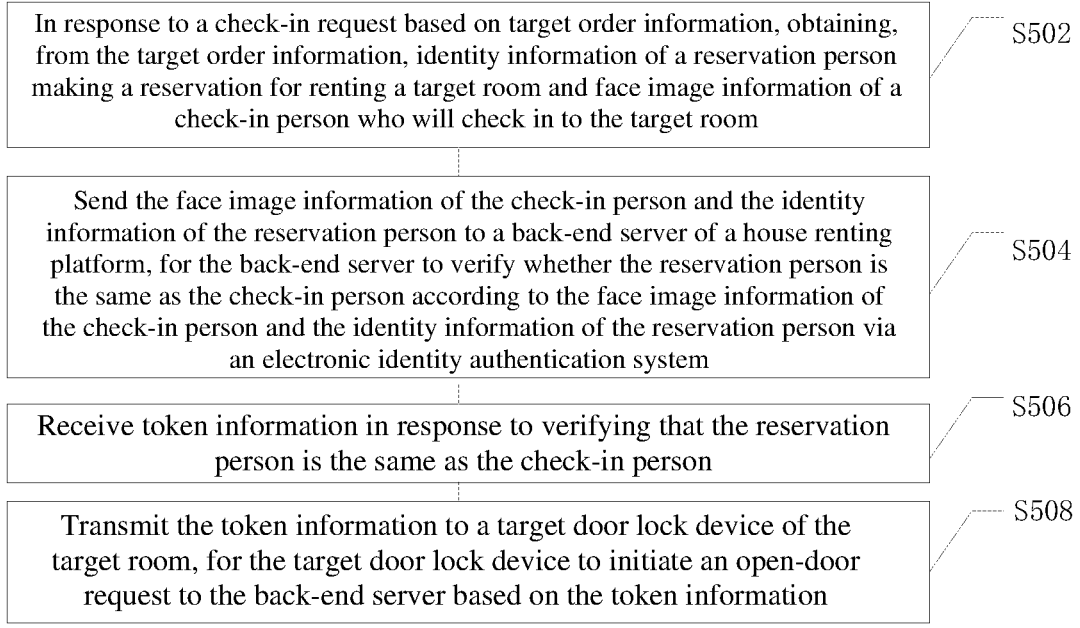
FIG. 5 is an another flowchart of a secure check-in method, according to an embodiment of the specification.

An embodiment of the specification further provides another secure check-in method, applied to a house renting platform. FIG. 5 is a flowchart of the secure check-in method, according to this embodiment of the specification, including the following steps.

At Step S502, the method may include obtaining, in response to a check-in request based on target order information, from the target order information, identity information of a reservation person making a reservation for renting a target room and face image information of a check-in person who will check in to the target room.

In this embodiment of the specification, when checking in to the target room, the check-in person may query for target order information by using a house renting platform loaded in a user terminal of the check-in person, and initiate a check-in request to the house renting platform based on the target order information. In response to the check-in request, the house renting platform obtains, from the target order information, identity information of a reservation person making a reservation for renting a target room and face image information of the check-in person who will check in to the target room. Specifically, the house renting platform may obtain the face image information of the check-in person by using a camera on a user terminal having an application of the house renting platform.

To further ensure the check-in security, the obtaining, in response to a check-in request based on target order information, from the target order information, identity information of a reservation person making a reservation for renting a target room and face image information of a check-in person who will check in to the target room may include: determining, in response to a check-in request based on target order information, whether a check-in person who will check in to a target room is in an area of the target room of the target order information; and obtaining, in response to determining that the check-in person is in the area, identity information of a reservation person making a reservation for renting the target room and face image information of the check-in person from the target order information.

In some embodiments, the determining whether the check-in person is in an area at which the target room in the target order information is located may include the following three manners: 1) determine whether a location of a user terminal of the check-in person having an application of the house renting platform is in the area at which the target room in the target order information is located, that is, obtain a location of the user terminal, of the check-in person, that is currently used for processing a check-in process and that is having an application of the house renting platform; and determine whether the location of the user terminal is in the area at which the target room in the target order information is located, and if the location of the user terminal is in the area at which the target room in the target order information is located, determine that the check-in person is in the area at which the target room in the target order information is located; 2) determine whether a user terminal of the check-in person loaded with the house renting platform application is connected to a target door lock device of the target room by using Bluetooth. That is, when the check-in person checks in, the check-in person is first reminded to connect the user terminal loaded with the house renting platform application to the target door lock device of the target room via Bluetooth; and when the user terminal loaded with the house renting platform application maintains connection with the target door lock device of the target room via Bluetooth, it is determined that the check-in person is in the area at which the target room in the target order information is located; 3) determine whether a user terminal of the check-in person loaded with the house renting platform application is connected to a target door lock device of the target room by using NFC. That is, when the check-in person checks in, the check-in person is first reminded to connect the user terminal loaded with the house renting platform application to the target door lock device of the target room via NFC; and when the user terminal loaded with the house renting platform application maintains connection with the target door lock device of the target room via NFC, it is determined that the check-in person is in the area at which the target room in the target order information is located.

At Step S504, the method may include sending the face image information of the check-in person and the identity information of the reservation person to a back-end server of the house renting platform, for the back-end server to verify whether the reservation person is the same as the check-in person according to the face image information of the check-in person and the identity information of the reservation person and via an electronic identity authentication system.

In this embodiment of the specification, the house renting platform sends the face image information of the check-in person and the identity information of the reservation person to the back-end server of the house renting platform. The back-end server verifies whether the reservation person is the same as the check-in person according to the face image information of the check-in person and the identity information of the reservation person and via an electronic identity authentication system; and if the reservation person is the same as the check-in person, generates token information for opening the target room, and sends the token information to the house renting platform.

At Step S506, the method may include receiving token information from the back-end server after verifying that the reservation person is the same as the check-in person.

At Step S508, the method may include transmitting the token information to a target door lock device of the target room, for the target door lock device to initiate a door-opening request to the back-end server based on the token information.

In this embodiment of the specification, the transmitting, by the house renting platform, the token information to the target door lock device of the target room may include the following three manners: 1) generate a door-opening two-dimensional barcode according to the token information, and transmit the door-opening two-dimensional barcode to the target door lock device via a camera on the target door lock device, to transmit the token information to the target door lock device. In this embodiment of the specification, the house renting platform generates a door-opening two-dimensional barcode according to the token information. The user shows the door-opening two-dimensional barcode to a camera on the target door lock device by using a user terminal loaded with the house renting platform application. The camera on the target door lock device obtains the door-opening two-dimensional barcode by scanning the door-opening two-dimensional barcode, to obtain the token information from the door-opening two-dimensional barcode. 2) transmit the token information to the target door lock device via Bluetooth of a user terminal loaded with the house renting platform application. 3) transmit the token information to the target door lock device via NFC of a user terminal loaded with the house renting platform application.

The target door lock device receives the token information, generates a door-opening request according to the token information and identification information of the target door lock device, and sends the door-opening request to the back-end server of the house renting platform. The back-end server receives the door-opening request. Specifically, the door-opening request includes the token information and the identification information of the target door lock device. In response to the door-opening request, the back-end server generates a door-opening instruction according to the door-opening request, and sends the door-opening instruction to the house renting platform. Specifically, a process in which the back-end server generates a door-opening instruction according to the door-opening request may include: obtaining, by the back-end server, the token information and identification information of the target door lock device according to the door-opening request, querying for order information corresponding to the target door lock device according to the identification information of the target door lock device, and matching identity information of a reservation person in the order information corresponding to the target door lock device with the identity information of the reservation person on which verification succeeds in the token information; and if identity information of a reservation person in a piece of order information corresponding to the target door lock device is matched with the identity information of the reservation person on which verification succeeds in the token information, generating a door-opening instruction, and delivering the door-opening instruction to the house renting platform.

A process of opening the target room according to the door-opening instruction may include: first, receiving the door-opening instruction from the back-end server. The door-opening instruction may be generated by the back-end server in response to the door-opening request, and the door-opening request may include the identification information of the target door lock device and the token information. Subsequently, the instruction may include transmitting the door-opening instruction to the target door lock device via Bluetooth or NFC of a user terminal loaded with the house renting platform application, for the target door lock device to open the target room in response to the door-opening instruction.

The identity information of the reservation person and the face image information of the check-in person are sent to a back-end server, token information from the back-end server when the reservation person is verified to be the same as the check-in person by the back-end server according to the identity information of the reservation person and the face image information of the check-in person is received, and the token information is transmitted to a target door lock device, for the target door lock device to initiate a door-opening request to the back-end server based on the token information. That is, after the reservation person is verified to be the same as the check-in person, the door-opening request is initiated, thereby achieving an in-person check-in effect and ensuring the check-in security.

Figure 6:
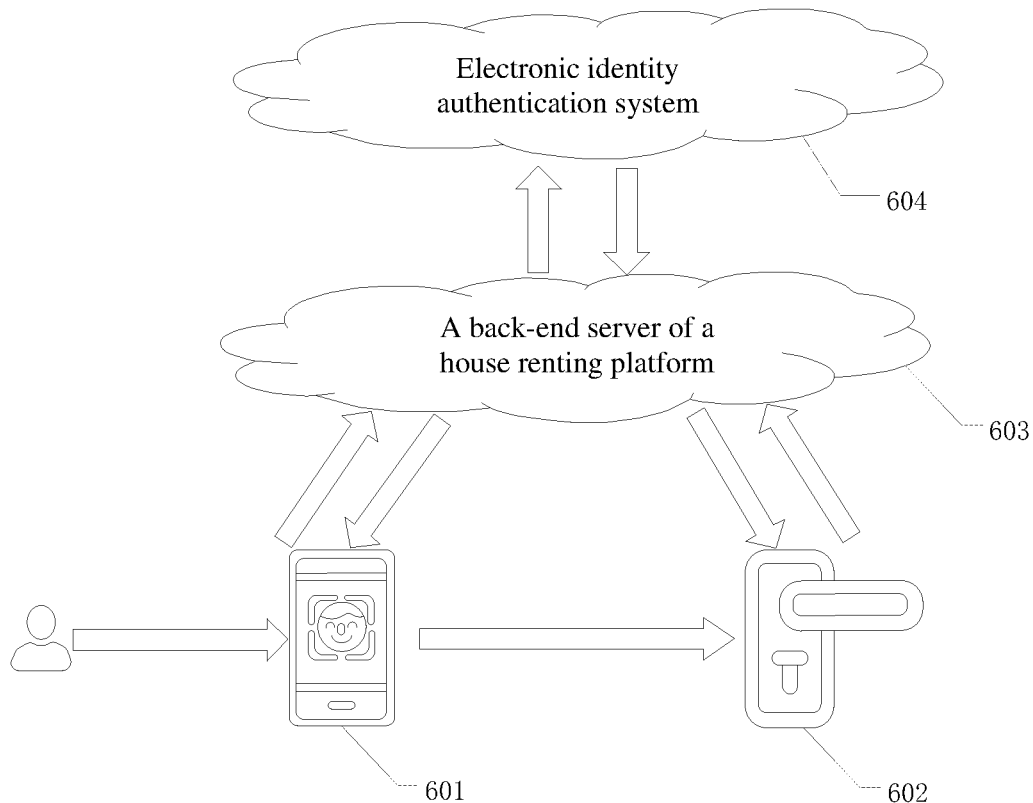
FIG. 6 is a schematic structural diagram of a secure check-in system, according to an embodiment of the specification.

FIG. 6 is a schematic structural diagram of a secure check-in system, according to an embodiment of the specification. As shown in FIG. 6, the secure check-in system may include: a user terminal 601 loaded with a house renting platform, a target door lock device 602 of a target room, a back-end server 603 of the house renting platform, and an electronic identity authentication system 604. As shown in FIG. 6, a reservation person may view housing resource information, determines the target room, and initiates a house renting request by using the house renting platform in the user terminal 601 loaded with the house renting platform application. The house renting platform in the user terminal 601 loaded with the house renting platform application obtains identity information of the reservation person and check-in information, and uploads the identity information of the reservation person, the check-in information, and information about the target room to the back-end server 603 of the house renting platform. The back-end server 603 of the house renting platform generates target order information according to the identity information of the reservation person, the check-in information, and the information about the target room.

A check-in person may query for the target order information and initiate a check-in request by using the house renting platform in the user terminal 601 loaded with the house renting platform application. The house renting platform in the user terminal 601 loaded with the house renting platform application obtains the identity information of the reservation person in the target order information in response to the check-in request, obtains face image information of the check-in person by using a camera on the user terminal 601 loaded with the house renting platform application, and uploads the identity information of the reservation person and the face image information of the check-in person to the back-end server 603 of the house renting platform. The back-end server 603 of the house renting platform uploads the face image information of the check-in person and the identity information of the reservation person that are received to the electronic identity authentication system 604. The electronic identity authentication system 604 verifies whether the check-in person and the reservation person are a same person according to the face image information of the check-in person and the identity information of the reservation person, and sends a verification receipt to the back-end server 603 of the house renting platform. If the verification receipt from the back-end server 603 of the house renting platform indicates that the verification succeeds, that is, the reservation person is the same as the check-in person, the back-end server generates token information, and delivers the token information to the house renting platform in the user terminal 601 loaded with the house renting platform application. The house renting platform in the user terminal 601 loaded with the house renting platform application transmits the token information to the target door lock device 602 of the target room. The target door lock device 602 of the target room transmits the token information and identification information of the target door lock device 602 of the target room to the back-end server 603 of the house renting platform. The back-end server 603 of the house renting platform determines whether the identity information of the reservation person in the order information corresponding to the target door lock device 602 of the target room is the same as identity information of a reservation person on which verification succeeds in the token information; and if the identity information of the reservation person in the order information corresponding to the target door lock device 602 of the target room is the same as identity information of a reservation person on which verification succeeds in the token information, the back-end server 603 may generate a door-opening instruction, and delivers the door-opening instruction to the target door lock device 602 of the target room. The target door lock device 602 of the target room opens the target room in response to the door-opening instruction.

Figure 7:
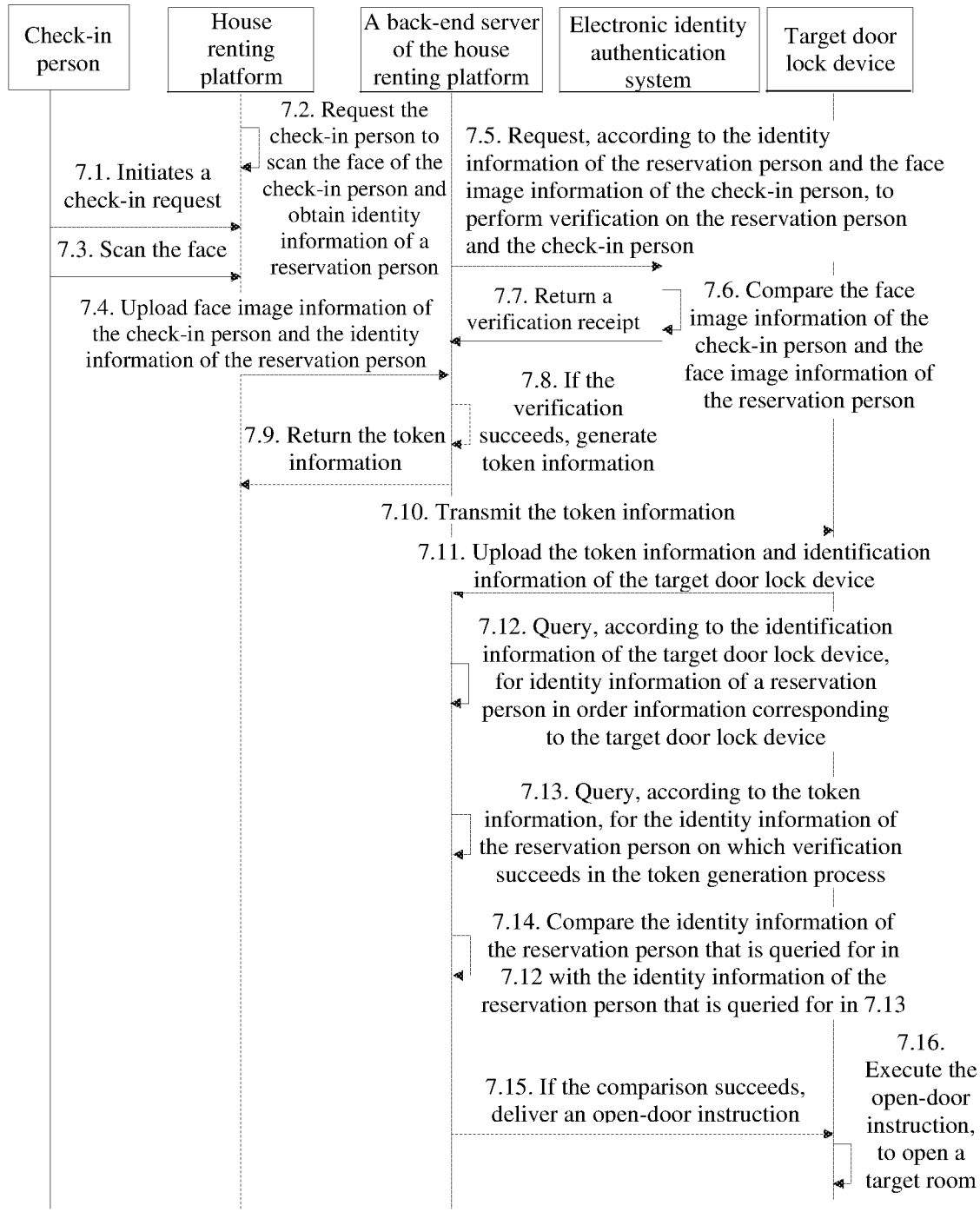
FIG. 7 is a flowchart of checking in and opening a door, according to an embodiment of the specification.

FIG. 7 is a schematic flowchart of checking in and opening a door, according to an embodiment of the specification, including the following process.

In 7.1, the process may include a check-in person initiating a check-in request to a house renting platform.

In 7.2, the process many include that, in response to the check-in request, the house renting platform requests the check-in person to perform face swiping and obtains identity information of a reservation person.

In 7.3, the process may include that the check-in person performs face swiping.

In 7.4, the process may include that the house renting platform uploads face image information of the check-in person and the identity information of the reservation person to a back-end server of the house renting platform.

In 7.5, the process may include that the back-end server of the house renting platform requests, according to the identity information of the reservation person and the face image information of the check-in person, to perform verification on the reservation person and the check-in person.

In 7.6, the process may include that an electronic identity authentication system queries for face image information of the reservation person according to the identity information of the reservation person, and compares the face image information of the check-in person with the face image information of the reservation person.

In 7.7, the process may include that the electronic identity authentication system returns a verification receipt to the back-end server of the house renting platform.

In 7.8, the process may include that, if the verification succeeds, that is, the reservation person is the same as the check-in person, the back-end server of the house renting platform generates token information.

In 7.9, the process may include that the background service of the house renting platform returns the token information to the house renting platform.

In 7.10, the process may include that the house renting platform transmits the token information to a target door lock device.

In 7.11, the process may include that, the target door lock device uploads the obtained token information and identification information of the target door lock to the back-end server of the house renting platform.

In 7.12, the process may include that the back-end server of the house renting platform queries, according to the identification information of the target door lock device, for identity information of a reservation person in order information corresponding to the target door lock device.

In 7.13, the process may include that the back-end server of the house renting platform queries, according to the token information, for the identity information of the reservation person on which verification succeeds in the token information.

In 7.14, the process may include that compare the identity information of the reservation person that is queried for in 7.12 with the identity information of the reservation person that is queried for in 7.13.

In 7.15, the process may include that if the comparison succeeds, deliver a door-opening instruction to the target door lock device.

In 7.16, the process may include that the target door lock device executes the door-opening instruction to open a target room.

Figure 8:
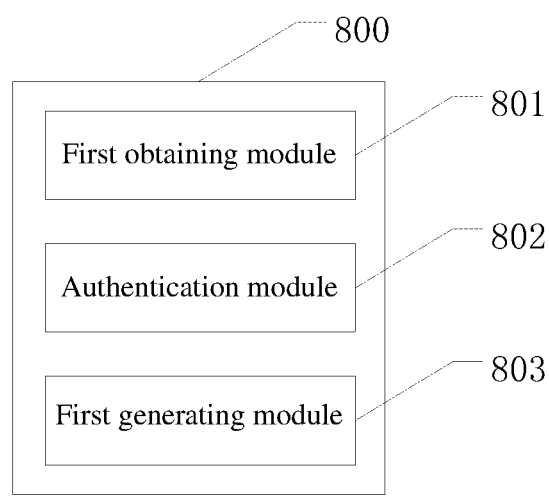
FIG. 8 is a block diagram of a secure check-in apparatus, according to an embodiment of the specification.

Corresponding to the foregoing secure check-in method in FIG. 1 and based on a same technical concept, an embodiment of the specification further provides a secure check-in apparatus, applied to a back-end server of a house renting platform. FIG. 8 is a block diagram of the secure check-in apparatus, according to this embodiment of the specification. The apparatus is configured to perform the foregoing secure check-in method shown in FIG. 1. As shown in FIG. 8, the apparatus 800 may include: a first obtaining module 801, a verification module 802, and a first generating module 803, where the first obtaining module 801 is configured to obtain identity information of a first reservation person making a reservation for renting a target room and face image information of a check-in person who will check in to the target room; the verification module 802 is configured to verify whether the reservation person is the same as the check-in person via an electronic identity authentication system according to the identity information of the reservation person and the face image information of the check-in person; and the first generating module 803 is configured to: if the reservation person is the same as the check-in person, generate token information for opening the target room, and send the token information to the house renting platform, for the check-in person to open the target room based on the token information.

In some embodiments, the apparatus 800 may further include: a first receiving module, configured to receive a door-opening request based on the token information by a target door lock device of the target room, the door-opening request including identification information of the target door lock device and the token information; a querying module, configured to query, according to the identification information of the target door lock device, for order information corresponding to the target door lock device; a matching module, configured to match identity information of a reservation person in the order information corresponding to the target door lock device with identity information of a reservation person on which verification succeeds in the token information; and a delivering module, configured to deliver, if the matching succeeds, a door-opening instruction to the target door lock device, for the target door lock device to open the target room in response to the door-opening instruction. In some embodiments, the first generating module 803 is specifically configured to: if the reservation person is the same as the check-in person, generate the token information for opening the target room, record a generation time and a valid time period of the token information, and send the token information, the generation time, and the valid time period to the house renting platform.

In some embodiments, the apparatus 800 may further include: a first receiving module, configured to receive a door-opening request based on the token information by a target door lock device of the target room. The door-opening request includes identification information of the target door lock device, the token information, the generation time, the valid time period, and a receiving time at which the target door lock device receives the token information; a determining module, configured to determine whether the token information is valid according to the generation time, the valid time period, and the receiving time; a querying module, configured to: if the token information is valid, query, according to the identification information of the target door lock device, for order information corresponding to the target door lock device; a matching module, configured to match identity information of a reservation person in the order information corresponding to the target door lock device with identity information of a reservation person on which verification succeeds in the token information; and a delivering module, configured to deliver, if the matching succeeds, a door-opening instruction to the target door lock device, for the target door lock device to open the target room in response to the door-opening instruction.

In some embodiments, the delivering module includes: a first obtaining unit, configured to: if the matching succeeds, obtain a check-in time period for which the reservation person rents the target room, and determine, according to the check-in time period, whether a current time meets a check-in condition; and a delivering unit, configured to: if the matching succeeds, deliver a door-opening instruction to the target door lock device.

In some embodiments, the delivering module is specifically configured to: directly deliver the door-opening instruction to the target door lock device; or deliver the door-opening instruction to the house renting platform, to deliver the door-opening instruction to the target door lock device via Bluetooth of a user terminal loaded with the house renting platform application; or deliver the door-opening instruction to the house renting platform, to deliver the door-opening instruction to the target door lock device via NFC of a user terminal loaded with the house renting platform application.

In some embodiments, the apparatus 800 may further include: a second receiving module, configured to receive the identity information of the reservation person, check-in information, and information about the target room that are sent, in response to a housing resource renting request, by the house renting platform; and a second generating unit, configured to generate target order information according to the identity information of the reservation person, the check-in information, and the information about the target room.

For the secure check-in apparatus in this embodiment of the specification, whether a reservation person is the same as a check-in person is verified via an electronic identity authentication system, identity information of the reservation person, and face image information of the check-in person. If the reservation person is the same as the check-in person, token information for opening a target room is generated, thereby implementing verification on consistency between the check-in person and the reservation person, achieving an in-person check-in effect, and ensuring check-in security. In addition, verification steps are simple and easy to perform, and verification efficiency is high.

Figure 9:
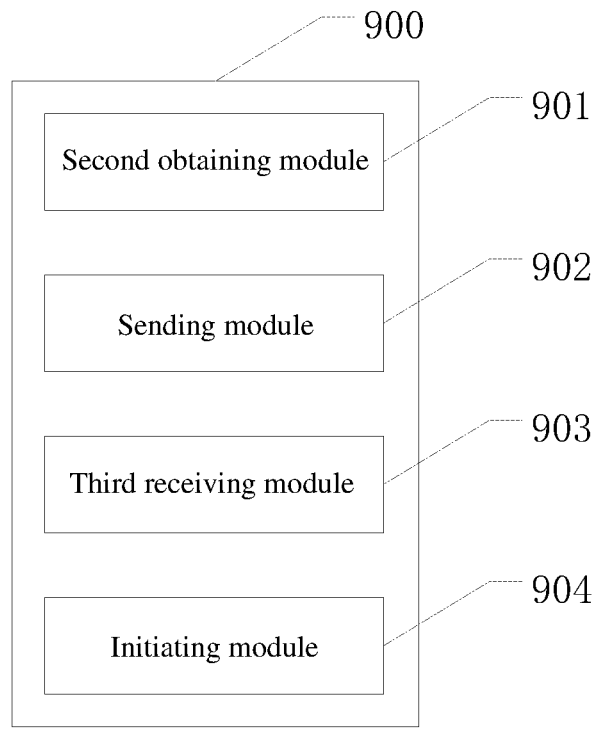
FIG. 9 is a block diagram of a secure check-in apparatus, according to an embodiment of the specification.

Corresponding to the foregoing secure check-in method in FIG. 5 and based on a same technical concept, an embodiment of the specification further provides a secure check-in apparatus, applied to a house renting platform. FIG. 9 is a block diagram of the secure check-in apparatus, according to this embodiment of the specification. The apparatus is configured to perform the foregoing secure check-in method shown in FIG. 5. As shown in FIG. 9, the apparatus 900 may include: a second obtaining module 901, a sending module 902, a third receiving module 903, and an initiating module 904, where the second obtaining module 901 is configured to obtain, in response to a check-in request based on target order information, from the target order information, identity information of a reservation person making a reservation for renting a target room and face image information of a check-in person who will check in to the target room; the sending module 902 is configured to send the face image information of the check-in person and the identity information of the reservation person to a back-end server of the house renting platform, for the back-end server to verify whether the reservation person is the same as the check-in person according to the face image information of the check-in person and the identity information of the reservation person and via an electronic identity authentication system; the third receiving module 903 is configured to receive token information from the back-end server after verifying that the reservation person is the same as the check-in person; and the initiating module 904 is configured to transmit the token information to a target door lock device of the target room, for the target door lock device to initiate a door-opening request to the back-end server based on the token information.

In some embodiments, the apparatus 900 may further include: a fourth receiving module, configured to receive a door-opening instruction from the back-end server, the door-opening instruction being generated by the back-end server in response to the door-opening request, and the door-opening request including identification information of the target door lock device and the token information; and a transmitting module, configured to transmit the door-opening instruction to the target door lock device via Bluetooth or NFC of a user terminal loaded with the house renting platform application, for the target door lock device to open the target room in response to the door-opening instruction.

In some embodiments, the second obtaining module 901 may include: a determining unit, configured to: in response to the check-in request based on the target order information, determine whether the check-in person is in an area at which the target room in the target order information is located; and a second obtaining unit, configured to: if the check-in person is in an area at which the target room in the target order information is located, obtain, from the target order information, the identity information of the reservation person renting the target room and the face image information of the check-in person.

In some embodiments, the determining unit is specifically configured to: determine whether a location of a user terminal of the check-in person loaded with the house renting platform application is in the area at which the target room in the target order information is located; or determine whether a user terminal of the check-in person loaded with the house renting platform application is connected to the target door lock device of the target room by using Bluetooth; or determine whether a user terminal of the check-in person loaded with the house renting platform application is connected to the target door lock device of the target room via NFC.

In some embodiments, the initiating module 904 is specifically configured to: generate a door-opening two-dimensional barcode according to the token information, and transmit the door-opening two-dimensional barcode to the target door lock device via a camera on the target door lock device, to transmit the token information to the target door lock device; or transmit the token information to the target door lock device via Bluetooth of a user terminal loaded with the house renting platform application; or transmit the token information to the target door lock device via NFC of a user terminal loaded with the house renting platform application.

For the secure check-in apparatus in this embodiment of the specification, the identity information of the reservation person and the face image information of the check-in person are sent to a back-end server, token information from the back-end server when the reservation person is verified to be the same as the check-in person by the back-end server according to the identity information of the reservation person and the face image information of the check-in person is received, and the token information is transmitted to a target door lock device, for the target door lock device to initiate a door-opening request to the back-end server based on the token information. That is, after the reservation person is verified to be the same as the check-in person, the door-opening request is initiated, thereby achieving an in-person check-in effect and ensuring the check-in security.

Figure 10:
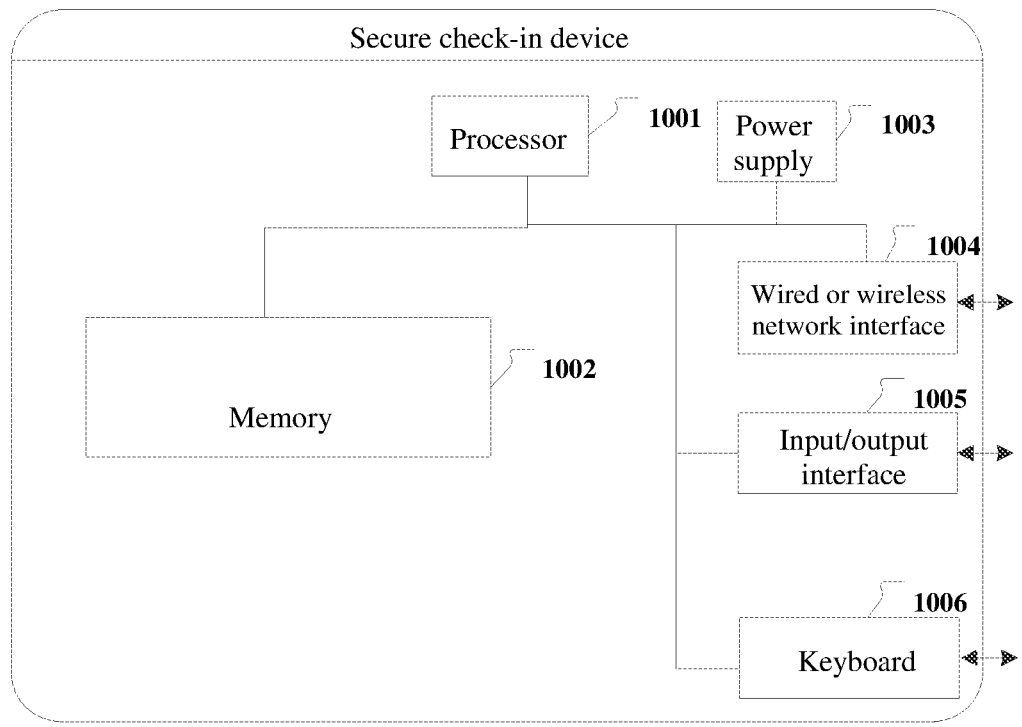
FIG. 10 is a schematic structural diagram of a secure check-in device, according to an embodiment of the specification.

Corresponding to the secure check-in method described above and based on a same technical concept, an embodiment of the specification further provides a secure check-in device. FIG. 10 is a schematic structural diagram of the secure check-in device, according to this embodiment of the specification. The device is configured to perform the secure check-in method described above.

As shown in FIG. 10, the secure check-in device may differ due to different configurations or different performance, and may include one or more processors 1001 and a memory 1002. The memory 1002 may store one or more storage application programs or one or more pieces of data. The memory 1002 may perform transient storage or persistent storage. The application program stored in the memory 1002 may include one or more modules (not shown in the figure), and each module may include a series of computer-executable instructions for the secure check-in device. Further, the processor 1001 may be configured to: communicate with the memory 1002, and execute, on the secure check-in device, the series of computer-executable instructions in the memory 1002. The secure check-in device may further include one or more power supplies 1003, one or more wired or wireless network interfaces 1004, one or more input/output interfaces 1005, one or more keyboards 1006, or the like.

In a specific embodiment, the secure check-in device is applied to a back-end server of a house renting platform. The secure check-in device includes a memory and one or more programs, where the one or more programs are stored in the memory and may include one or more modules, and each module may include a series of computer-executable instructions for the secure check-in device. The one or more programs configured to be executed by one or more processors include computer-executable instructions used for performing the following operations: obtaining identity information of a first reservation person making a reservation for renting a target room and face image information of a check-in person who will check in to the target room; verifying, based on the returned receipt information, whether the first reservation person is the same as the check-in person; generating, in response to verifying that the first reservation person is the same as the check-in person, token information for opening the target room; sending to the renting platform the token information to open the target room for the check-in person to open the target room based on the token information.

In some embodiments, when the computer-executable instructions are executed, after the sending the token information to the house renting platform, the following is further included: receiving a door-opening request based on the token information by a target door lock device of the target room, the door-opening request including identification information of the target door lock device and the token information; querying, according to the identification information of the target door lock device, for order information corresponding to the target door lock device; matching identity information of a reservation person in the order information corresponding to the target door lock device with the identity information of the reservation person on which verification succeeds in the token information; and delivering, if the matching succeeds, a door-opening instruction to the target door lock device, for the target door lock device to open the target room in response to the door-opening instruction.

In some embodiments, when the computer-executable instructions are executed, the generating token information for opening the target room, and sending the token information to the house renting platform includes: generating the token information for opening the target room, recording a generation time and a valid time period of the token information, and sending the token information, the generation time, and the valid time period to the house renting platform. In some embodiments, when the computer-executable instructions are executed, after the sending the token information, the generation time, and the valid time period to the house renting platform, the following is further included: receiving a door-opening request from a target door lock device of the target room based on the token information, wherein the door-opening request comprises identification information of the target door lock device, the token information, the generation time, the valid time period, and a receiving time at which the target door lock device receives the token information; determining whether the token information is valid according to the generation time, the valid time period, and the receiving time; querying, if the token information is valid, according to the identification information of the target door lock device, for order information corresponding to the target door lock device; matching identity information of a second reservation person in the order information corresponding to the target door lock device with the identity information of the first reservation person; and delivering, if the identity information of the second reservation person is matched with the identity information of the first reservation person, to the target door lock device a door-opening instruction to open the target room.

In some embodiments, when the computer-executable instructions are executed, the delivering, if the matching succeeds, a door-opening instruction to the target door lock device includes: if the matching succeeds, obtaining a check-in time period for which the reservation person rents the target room, and determining, according to the check-in time period, whether a current time meets a check-in condition; and if the current time meets the check-in condition, delivering a door-opening instruction to the target door lock device.

In some embodiments, when the computer-executable instructions are executed, the delivering a door-opening instruction to the target door lock device includes: directly delivering the door-opening instruction to the target door lock device; or delivering the door-opening instruction to the house renting platform, to deliver the door-opening instruction to the target door lock device via Bluetooth of a user terminal loaded with the house renting platform application; or delivering the door-opening instruction to the house renting platform, to deliver the door-opening instruction to the target door lock device via NFC of a user terminal loaded with the house renting platform application.

In some embodiments, when the computer-executable instructions are executed, the following is further included: receiving the identity information of the reservation person, check-in information, and information about the target room that are sent, in response to a housing resource renting request, by the house renting platform; and generating target order information according to the identity information of the reservation person, the check-in information, and the information about the target room.

For the secure check-in device in this embodiment of the specification, whether a reservation person is the same as a check-in person is verified via an electronic identity authentication system, identity information of the reservation person, and face image information of the check-in person. If the reservation person is the same as the check-in person, token information for opening a target room is generated, thereby implementing verification on consistency between the check-in person and the reservation person, achieving an in-person check-in effect, and ensuring check-in security. In addition, verification steps are simple and easy to perform, and verification efficiency is high.

In another embodiment, the secure check-in device is applied to a house renting platform. The secure check-in device includes a memory and one or more programs, where the one or more programs are stored in the memory and may include one or more modules, and each module may include a series of computer-executable instructions for the secure check-in device. The one or more programs configured to be executed by one or more processors include computer-executable instructions used for performing the following operations: obtaining, in response to a check-in request based on target order information, from the target order information, identity information of a reservation person making a reservation for renting a target room and face image information of a check-in person who will check in to the target room; sending the face image information of the check-in person and the identity information of the reservation person to a back-end server of the house renting platform, for the back-end server to verify whether the reservation person is the same as the check-in person according to the face image information of the check-in person and the identity information of the reservation person via an electronic identity authentication system; receiving token information from the back-end server after verifying that the reservation person is the same as the check-in person; and transmitting the token information to a target door lock device of the target room, for the target door lock device to initiate a door-opening request to the back-end server based on the token information.

In some embodiments, when the computer-executable instructions are executed, the following is further included: receiving a door-opening instruction from the back-end server, the door-opening instruction being generated by the back-end server in response to the door-opening request, and the door-opening request including identification information of the target door lock device and the token information; and transmitting the door-opening instruction to the target door lock device via Bluetooth or NFC of a user terminal loaded with the house renting platform application, for the target door lock device to open the target room in response to the door-opening instruction.

In some embodiments, when the computer-executable instructions are executed, the obtaining, in response to a check-in request based on target order information, from the target order information, identity information of a reservation person making a reservation for renting a target room and face image information of a check-in person who will check in to the target room includes: determining, in response to a check-in request based on target order information, whether a check-in person who will check in to a target room is in an area of the target room of the target order information; obtaining, in response to determining that the check-in person is in the area, identity information of a reservation person making a reservation for renting the target room and face image information of the check-in person from the target order information; obtaining, in response to determining that the check-in person is in the area, identity information of a reservation person making a reservation for renting the target room and face image information of the check-in person from the target order information.

In some embodiments, when the computer-executable instructions are executed, the determining whether the check-in person is in an area at which the target room in the target order information is located includes: determining whether a location of a user terminal of the check-in person loaded with the house renting platform application is in the area at which the target room in the target order information is located; or determining whether a user terminal of the check-in person loaded with the house renting platform application is connected to the target door lock device of the target room via Bluetooth; or determining whether a user terminal of the check-in person loaded with the house renting platform application is connected to the target door lock device of the target room via NFC.

In some embodiments, when the computer-executable instructions are executed, the transmitting the token information to a target door lock device of the target room includes: generating a door-opening two-dimensional barcode according to the token information, and transmitting the door-opening two-dimensional barcode to the target door lock device by using a camera on the target door lock device, to transmit the token information to the target door lock device; or transmitting the token information to the target door lock device via Bluetooth of a user terminal loaded with the house renting platform application; or transmitting the token information to the target door lock device via NFC of a user terminal loaded with the house renting platform application.

For the secure check-in device in this embodiment of the specification, the identity information of the reservation person and the face image information of the check-in person are sent to a back-end server, token information sent by the back-end server when the reservation person and the check-in person are verified to be a same person by the back-end server according to the identity information of the reservation person and the face image information of the check-in person is received, and the token information is transmitted to a target door lock device, for the target door lock device to initiate a door-opening request to the back-end server based on the token information. That is, after the reservation person is verified to be the same as the check-in person, the door-opening request is initiated, thereby achieving an in-person check-in effect and ensuring the check-in security.

Corresponding to the secure check-in method described above and based on a same technical concept, an embodiment of the specification further provides a storage medium, configured to store computer-executable instructions.

In a specific embodiment, the storage medium is applied to a back-end server of a house renting platform. The storage medium may be a USB flash drive, an optical disc, a hard disk, or the like. When being executed by a processor, the computer-executable instructions stored in the storage medium can implement the following process: obtaining identity information of a reservation person making a reservation for renting a target room and face image information of a check-in person who will check in to the target room; verifying whether the reservation person is the same as the check-in person via an electronic identity authentication system according to the identity information of the reservation person and the face image information of the check-in person; and generating, in response to verifying that the first reservation person is the same as the check-in person, token information for opening the target room; and sending to the renting platform the token information to open the target room.

In some embodiments, when the computer-executable instructions stored in the storage medium is executed by the processor, after the sending the token information to the house renting platform, the following is further included: receiving a door-opening request based on the token information by a target door lock device of the target room, the door-opening request including identification information of the target door lock device and the token information; querying, according to the identification information of the target door lock device, for order information corresponding to the target door lock device; matching identity information of a reservation person in the order information corresponding to the target door lock device with the identity information of the reservation person on which verification succeeds in the token information; and delivering, if the matching succeeds, a door-opening instruction to the target door lock device, for the target door lock device to open the target room in response to the door-opening instruction.

In some embodiments, when the computer-executable instructions stored in the storage medium is executed by the processor, the generating token information for opening the target room, and sending the token information to the house renting platform includes: recording a generation time and a valid time period of the token information, and sending the token information, the generation time, and the valid time period to the house renting platform.

In some embodiments, when the computer-executable instructions stored in the storage medium is executed by the processor, after the sending the token information, the generation time, and the valid time period to the house renting platform, the following is further included: receiving a door-opening request based on the token information by a target door lock device of the target room, the door-opening request including identification information of the target door lock device, the token information, the generation time, the valid time period, and a receiving time at which the target door lock device receives the token information; determining whether the token information is valid according to the generation time, the valid time period, and the receiving time; if the token information is valid, querying, according to the identification information of the target door lock device, for order information corresponding to the target door lock device; matching identity information of a reservation person in the order information corresponding to the target door lock device with the identity information of the reservation person on which verification succeeds in the token information; and delivering, if the matching succeeds, a door-opening instruction to the target door lock device, for the target door lock device to open the target room in response to the door-opening instruction.

In some embodiments, when the computer-executable instructions stored in the storage medium is executed by the processor, the delivering, if the matching succeeds, a door-opening instruction to the target door lock device includes: if the matching succeeds, obtaining a check-in time period for which the reservation person rents the target room, and determining, according to the check-in time period, whether a current time meets a check-in condition; and if the current time meets a check-in condition, delivering a door-opening instruction to the target door lock device.

In some embodiments, when the computer-executable instructions stored in the storage medium is executed by the processor, the delivering a door-opening instruction to the target door lock device includes: directly delivering the door-opening instruction to the target door lock device; or delivering the door-opening instruction to the house renting platform, to deliver the door-opening instruction to the target door lock device via Bluetooth of a user terminal loaded with the house renting platform application; or delivering the door-opening instruction to the house renting platform, to deliver the door-opening instruction to the target door lock device via NFC of a user terminal loaded with the house renting platform application.

In some embodiments, when the computer-executable instructions stored in the storage medium is executed by the processor, the following is further included: receiving the identity information of the reservation person, check-in information, and information about the target room that are sent, in response to a housing resource renting request, by the house renting platform; and generating target order information according to the identity information of the reservation person, the check-in information, and the information about the target room.

When the computer-executable instructions stored in the storage medium in this embodiment of the specification is executed by the processor, whether a reservation person is verified to be the same as a check-in person via an electronic identity authentication system, identity information of the reservation person, and face image information of the check-in person. If the reservation person is the same as the check-in person, token information for opening a target room is generated, thereby implementing verification on consistency between the check-in person and the reservation person, achieving an in-person check-in effect, and ensuring check-in security. In addition, verification steps are simple and easy to perform, and verification efficiency is high.

In a specific embodiment, the storage medium is applied to a house renting platform. The storage medium may be a USB flash drive, an optical disc, a hard disk, or the like. When being executed by a processor, the computer-executable instructions stored in the storage medium can implement the following process: obtaining, in response to a check-in request based on target order information, from the target order information, identity information of a reservation person making a reservation for renting a target room and face image information of a check-in person who will check in the target room; sending the face image information of the check-in person and the identity information of the reservation person to a back-end server of the house renting platform, for the back-end server to verify whether the reservation person and the check-in person are a same person according to the face image information of the check-in person and the identity information of the reservation person via an electronic identity authentication system; receiving token information sent by the back-end server after verifying that the reservation person is the same as the check-in person; and transmitting the token information to a target door lock device of the target room, for the target door lock device to initiate a door-opening request to the back-end server based on the token information.

In some embodiments, when the computer-executable instructions stored in the storage medium is executed by the processor, the following is further included: receiving a door-opening instructions sent by the back-end server, the door-opening instruction being generated by the back-end server in response to the door-opening request, and the door-opening request including identification information of the target door lock device and the token information; and transmitting the door-opening instruction to the target door lock device via Bluetooth or NFC of a user terminal loaded with the house renting platform application, for the target door lock device to open the target room in response to the door-opening instruction.

In some embodiments, when the computer-executable instructions stored in the storage medium is executed by the processor, the obtaining, in response to a check-in request based on target order information, from the target order information, identity information of a reservation person making a reservation for renting a target room and face image information of a check-in person who will check in the target room includes: in response to the check-in request based on the target order information, determining whether the check-in person is in an area at which the target room in the target order information is located; and if the check-in person is in an area at which the target room in the target order information is located, obtaining, from the target order information, the identity information of the reservation person and the face image information of the check-in person.

In some embodiments, when the computer-executable instructions stored in the storage medium is executed by the processor, the determining whether the check-in person is in an area at which the target room in the target order information is located includes: determining whether a location of a user terminal of the check-in person loaded with the house renting platform application is in the area at which the target room in the target order information is located; or determining whether a user terminal of the check-in person loaded with the house renting platform application is connected to the target door lock device of the target room via Bluetooth; or determining whether a user terminal of the check-in person loaded with the house renting platform application is connected to the target door lock device of the target room via NFC.

In some embodiments, when the computer-executable instructions stored in the storage medium is executed by the processor, the transmitting the token information to a target door lock device of the target room includes: generating a door-opening two-dimensional barcode according to the token information, and transmitting the door-opening two-dimensional barcode to the target door lock device by using a camera on the target door lock device, to transmit the token information to the target door lock device; or transmitting the token information to the target door lock device via Bluetooth of a user terminal loaded with the house renting platform application; or transmitting the token information to the target door lock device via NFC of a user terminal loaded with the house renting platform application.

When the computer-executable instructions stored in the storage medium in this embodiment of the specification is executed by a processor, identity information of a reservation person and face image information of a check-in person are sent to a back-end server, token information from the back-end server when the reservation person is verified to be the same as the check-in person by the back-end server according to the identity information of the reservation person and the face image information of the check-in person is received, and the token information is transmitted to a target door lock device, for the target door lock device to initiate a door-opening request to the back-end server based on the token information. That is, after the reservation person is verified to be the same as the check-in person, the door-opening request is initiated, thereby achieving an in-person check-in effect and ensuring the check-in security.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art may also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of the specification, the function of the units may be implemented in a same piece of or multiple pieces of software and/or hardware.

A person skilled in the art should understand that the embodiments of the specification may be provided as a method, a system, or a computer program product. Therefore, the specification may use a form of a hardware-only embodiment, a software-only embodiment, or an embodiment combining software and hardware. In addition, the specification may use a form of a computer program product implemented on one or more computer available storage media (including but not limited to a disk memory, a CD-ROM, an optical memory, and the like) including computer available program code.

The specification is described with reference to flowcharts and/or block diagrams of the method, the device (system), and the computer program product in the embodiments of the specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be computer readable instructions, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of the specification may be provided as a method, a system, or a computer program product. Therefore, the specification may use a form of hardware only embodiments, software only embodiments, or embodiments with a combination of software and hardware. In addition, the specification may use a form of a computer program product implemented on one or more computer available storage media (including but not limited to a disk memory, a CD-ROM, an optical memory, and the like) including computer available program code.

The specification can be described in the general context of computer executable instructions executed by a computer, for example, a program module. Generally, the program module includes a routine, a program, an object, a component, a data structure, and the like for executing a particular task or implementing a particular abstract data type. The specification can also be practiced in a distributed computing environment in which tasks are performed by remote processing devices that are connected through a communication network. In a distributed computing environment, the program module may be located in both local and remote computer storage media including storage devices.

The embodiments of the specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification may fall within the scope of the claims of the specification.

What is claimed is:

1. A method comprising:
   obtaining, by a server, identity information identifying a first reservation person making a reservation for renting a target room and face image information of a check-in person who requests to check in to the target room;
   uploading, by the server, the identity information identifying the first reservation person and the face image information of the check-in person to an electronic identity authentication server that stores electronic identity information;
   receiving, by the server from the electronic identity authentication server, a verification result indicating whether the first reservation person and the check-in person are the same person, wherein the verification result is generated by the electronic identity authentication server based on comparison of face image information of the first reservation person with the face image information of the check-in person;
   generating, by the server in response to the verification result indicating that the first reservation person is the same as the check-in person, token information for opening the target room;
   transmitting, by the server, the token information to a target door lock device without involving a device of the check-in person, wherein the target door lock device locks the target room;
   receiving, by the server from the target door lock device, a door-opening request comprising identification information identifying the target door lock device and the token information;
   verifying, by the server, whether the token information is valid;
   in response to verifying that the token information is valid, querying, by the server according to the identification information identifying the target door lock device, for order information corresponding to the target door lock device;
   obtaining, by the server through the querying, identity information identifying a second reservation person in the order information corresponding to the target door lock device;
   matching, by the server, the identity information identifying the second reservation person in the order information corresponding to the target door lock device with the identity information identifying the first reservation person; and
   delivering, by the server, in response to the identity information identifying the second reservation person matching with the identity information identifying the first reservation person, a door-opening instruction to the target door lock device to open the target room.

2. The method according to claim 1, wherein the delivering, by the server, in response to the identity information identifying the second reservation person matching with the identity information identifying the first reservation person, a door-opening instruction to the target door lock device to open the target room comprises:
   obtaining, if the identity information identifying the second reservation person is matched with the identity information identifying the first reservation person, a check-in time period of the target room, and determining, according to the check-in time period, whether a current time meets a check-in condition; and
   delivering, if the current time meets the check-in condition, the door-opening instruction to the target door lock device.

3. The method according to claim 1, wherein the delivering the door-opening instruction to the target door lock device comprises:
   delivering the door-opening instruction to a mobile terminal of the check-in person for the mobile terminal to deliver the door-opening instruction to the target door lock device via Bluetooth wireless communication.

4. The method according to claim 1, wherein the delivering the door-opening instruction to the target door lock device comprises:
   delivering the door-opening instruction to a mobile terminal of the check-in person for the mobile terminal to deliver the door-opening instruction to the target door lock device via near field wireless communication.

5. The method according to claim 1, wherein the door-opening instruction includes a two-dimensional barcode and the delivering the door-opening instruction to the target door lock device comprises delivering the two-dimensional barcode to a mobile terminal of the check-in person for the mobile terminal to display the two-dimensional barcode to the target door lock device.

6. The method according to claim 1, wherein
   the generating token information for opening the target room comprises: recording a generation time at which the token information is generated and a valid time period of the token information in the token information.

7. The method according to claim 6, wherein the door-opening request further comprises a receiving time at which the target door lock device receives the token information, and the verifying whether the token information is valid comprises:
   verifying whether the token information is valid according to the generation time, the valid time period, and the receiving time.

8. The method according to claim 1, further comprising:
obtaining, by the server in response to a renting request, the identity information identifying the first reservation person, check-in information, and information of the target room; and
generating, by the server, order information according to the identity information identifying the first reservation person, the check-in information, and the information of the target room.

9. The method according to claim 8, wherein the identity information identifying the first reservation person includes identity card information, the check-in information includes a check-in time period and a number of check-in persons, and the information of the target room includes the identification information identifying the target door lock device that locks the target room and location information of the target room.

10. A system comprising:
a processor; and
a memory storing computer-executable instructions, executable by the processor to cause the processor to perform operations comprising:
obtaining identity information identifying a first reservation person making a reservation for renting a target room and face image information of a check-in person who requests to check in to the target room;
uploading, from a renting platform, the identity information identifying the first reservation person and the face image information of the check-in person to an electronic identity authentication server that stores electronic identity information;
receiving, from the electronic identity authentication server, a verification result indicating whether the first reservation person and the check-in person are the same person, wherein the verification result is generated by the electronic identity authentication server based on comparison of face image information of the first reservation person with the face image information of the check-in person;
generating, in response to the verification result indicating that the first reservation person is the same as the check-in person, token information for opening the target room;
transmitting the token information to a target door lock device without involving a device of the check-in person, wherein the target door lock device locks the target room;
receiving from the target door lock device a door-opening request comprising identification information identifying the target door lock device and the token information;
verifying whether the token information is valid;
in response to verifying that the token information is valid, querying, according to the identification information identifying the target door lock device, for order information corresponding to the target door lock device;
obtaining, through the querying, identity information identifying a second reservation person in the order information corresponding to the target door lock device;
matching identity information identifying the second reservation person in the order information corresponding to the target door lock device with the identity information identifying the first reservation person; and
delivering, in response to the identity information identifying the second reservation person matching with the identity information identifying the first reservation person, a door-opening instruction to the target door lock device to open the target room.

11. The system according to claim 10, wherein the delivering, in response to the identity information identifying the second reservation person matching with the identity information identifying the first reservation person, a door-opening instruction to the target door lock device to open the target room comprises:
obtaining, if the identity information identifying the second reservation person is matched with the identity information identifying the first reservation person, a check-in time period of the target room, and determining, according to the check-in time period, whether a current time meets a check-in condition; and
delivering, if the current time meets the check-in condition, the door-opening instruction to the target door lock device.

12. The system according to claim 10, wherein the delivering the door-opening instruction to the target door lock device comprises:
delivering the door-opening instruction to a mobile terminal of the check-in person for the mobile terminal to deliver the door-opening instruction to the target door lock device via Bluetooth wireless communication.

13. The system according to claim 10, wherein the delivering the door-opening instruction to the target door lock device comprises:
delivering the door-opening instruction to a mobile terminal of the check-in person for the mobile terminal to deliver the door-opening instruction to the target door lock device via near field wireless communication.

14. The system according to claim 10, wherein the door-opening instruction includes a two-dimensional barcode and the delivering the door-opening instruction to the target door lock device comprises delivering the two-dimensional barcode to a mobile terminal of the check-in person for the mobile terminal to display the two-dimensional barcode to the target door lock device.

15. The system according to claim 10, wherein the generating token information for opening the target room comprises: recording a generation time at which the token information is generated and a valid time period of the token information in the token information.

16. The system according to claim 15, wherein the door-opening request further comprises a receiving time at which the target door lock device receives the token information, and the verifying whether the token information is valid comprises:
verifying whether the token information is valid according to the generation time, the valid time period, and the receiving time.

17. The system according to claim 10, wherein the operations further comprise:
obtaining, in response to a renting request, the identity information identifying the first reservation person, check-in information, and information of the target room; and
generating order information according to the identity information identifying the first reservation person, the check-in information, and the information of the target room.

18. The system according to claim 17, wherein the identity information identifying the first reservation person includes identity card information, the check-in information includes a check-in time period and a number of check-in persons, and the information of the target room includes the identification information identifying the target door lock device that locks the target room and location information of the target room.

19. A non-transitory computer-readable storage medium configured with instructions executable by one or more processors to cause the one or more processors to perform operations comprising:

obtaining identity information identifying a first reservation person making a reservation for renting a target room and face image information of a check-in person who requests to check in to the target room;

uploading, from a renting platform, the identity information identifying the first reservation person and the face image information of the check-in person to an electronic identity authentication server that stores electronic identity information;

receiving, from the electronic identity authentication server, a verification result indicating whether the first reservation person and the check-in person are the same person, wherein the verification result is generated by the electronic identity authentication server based on comparison of face image information of the first reservation person with the face image information of the check-in person;

generating, in response to the verification result indicating that the first reservation person is the same as the check-in person, token information for opening the target room;

transmitting the token information to a target door lock device without involving a device of the check-in person, wherein the target door lock device locks the target room;

receiving from the target door lock device a door-opening request comprising identification information identifying the target door lock device and the token information;

verifying whether the token information is valid;

in response to verifying that the token information is valid, querying, according to the identification information identifying the target door lock device, for order information corresponding to the target door lock device;

obtaining, through the querying, identity information identifying a second reservation person in the order information corresponding to the target door lock device;

matching identity information identifying the second reservation person in the order information corresponding to the target door lock device with the identity information identifying the first reservation person; and delivering, in response to the identity information identifying the second reservation person matching with the identity information identifying the first reservation person, a door-opening instruction to the target door lock device to open the target room.

20. The storage medium according to claim 19, wherein the delivering, in response to the identity information identifying the second reservation person matching with the identity information identifying the first reservation person, a door-opening instruction to the target door lock device to open the target room comprises:

obtaining, if the identity information identifying the second reservation person is matched with the identity information identifying the first reservation person, a check-in time period of the target room, and determining, according to the check-in time period, whether a current time meets a check-in condition; and delivering, if the current time meets the check-in condition, the door-opening instruction to the target door lock device.

* * * * *